US010284136B1

(12) United States Patent
Mayfield et al.

(10) Patent No.: US 10,284,136 B1
(45) Date of Patent: May 7, 2019

(54) NARROW FLASHING FOR WATERPROOF MOUNTING OF SOLAR PANELS TO A ROOF (71) Applicant: Unirac Inc., Albuquerque, NM (US)

(72) Inventors: Jason Mayfield, Albuquerque, NM (US); Nathan Schuit, Edgewood, NM (US)

(73) Assignee: Unirac Inc., Albuquerque, NM (US)

( * ) Notice: Subject to any disclaimer, the term of this patent is extended or adjusted under 35 U.S.C. 154(b) by 0 days.

(21) Appl. No.: 15/785,492

(22) Filed: Oct. 17, 2017

(51) Int. Cl.
*H02S 20/23* (2014.01)
*E04B 1/66* (2006.01)
*E04B 1/41* (2006.01)
*F24S 25/61* (2018.01)
*F24S 25/636* (2018.01)
*E04B 1/38* (2006.01)
*F24S 25/00* (2018.01)

(52) U.S. Cl.
CPC ............... *H02S 20/23* (2014.12); *E04B 1/40* (2013.01); *E04B 1/66* (2013.01); *F24S 25/61* (2018.05); *F24S 25/636* (2018.05); *E04B 2001/405* (2013.01); *F24S 2025/021* (2018.05)

(58) Field of Classification Search
CPC ......... H02S 20/23; F24S 25/61; F24S 25/636; F24S 2025/021; E04B 1/40; E04B 1/66; E04B 2001/405
USPC ................................................. 52/58, 173.3
See application file for complete search history.

(56) References Cited

U.S. PATENT DOCUMENTS

| 7,762,027 | B1 | 7/2010 | Wentworth et al. |
| 7,895,808 | B1 | 3/2011 | Wentworth et al. |
| 7,905,064 | B1 | 3/2011 | Wentworth et al. |
| 7,921,607 | B2 | 4/2011 | Thompson et al. |
| 8,122,648 | B1 | 2/2012 | Liu |
| 8,146,299 | B2* | 4/2012 | Stearns .................. E04D 13/10 52/58 |
| 8,151,522 | B2 | 4/2012 | Stearns et al. |
| 8,153,700 | B2 | 4/2012 | Stearns et al. |
| 8,166,713 | B2 | 5/2012 | Stearns et al. |
| 8,181,398 | B2 | 5/2012 | Stearns et al. |
| 8,209,914 | B2* | 7/2012 | Stearns .................. E04D 13/10 52/58 |
| 8,225,557 | B2 | 7/2012 | Stearns et al. |
| 8,245,454 | B2 | 8/2012 | Stearns et al. |
| 8,250,829 | B2 | 8/2012 | McPheeters et al. |
| 8,272,174 | B2 | 9/2012 | Stearns et al. |
| 8,316,592 | B2 | 11/2012 | Lanza |
| 8,413,388 | B2 | 4/2013 | Stearns et al. |
| 8,448,405 | B2* | 5/2013 | Schaefer .................. E04C 3/06 52/710 |
| 8,479,455 | B2 | 7/2013 | Schaefer et al. |
| 8,539,719 | B2* | 9/2013 | McPheeters ........ E04D 13/1476 52/27 |
| 8,661,765 | B2 | 3/2014 | Schaefer et al. |
| 8,689,517 | B2 | 4/2014 | Schaefer et al. |

(Continued)

*Primary Examiner* — Brent W Herring
(74) *Attorney, Agent, or Firm* — Lee & Hayes, P.C.

(57) ABSTRACT

Improved versions of flat flashings are used for waterproofing mounting hardware that holds photovoltaic solar panels on a roof; typically, such a roof is a pitched, composition shingle roof. The flashings are narrow in width, and have chamfered and/or rounded corners, and a variety of alignment marks printed on the flashing for aligning the flashing with adjacent shingles. The height/width aspect ratio of the flashing can range from 1.4 to 2.0, or more.

23 Claims, 8 Drawing Sheets

(56) References Cited

U.S. PATENT DOCUMENTS

| | | | | |
|---|---|---|---|---|
| 8,701,354 | B2 | 4/2014 | Stearns et al. | |
| 8,707,654 | B2 | 4/2014 | Schaefer et al. | |
| 8,707,655 | B2 | 4/2014 | Schaefer et al. | |
| 8,713,858 | B1 | 5/2014 | Xie | |
| 8,739,471 | B2 | 6/2014 | McPheeters et al. | |
| 8,752,338 | B2 | 6/2014 | Schaefer et al. | |
| 8,756,881 | B2* | 6/2014 | West | E04B 1/38 52/173.3 |
| 8,833,032 | B2 | 9/2014 | Schaefer et al. | |
| 8,833,033 | B2 | 9/2014 | Schaefer et al. | |
| 8,869,470 | B2 | 10/2014 | Lanza | |
| 8,869,490 | B2 | 10/2014 | Schaefer et al. | |
| 8,935,893 | B2* | 1/2015 | Liu | F16L 3/06 52/173.3 |
| 8,938,932 | B1 | 1/2015 | Wentworth et al. | |
| 9,062,897 | B2* | 6/2015 | West | E04B 1/38 |
| 9,068,339 | B2 | 6/2015 | Schaefer et al. | |
| 9,097,441 | B2* | 8/2015 | West | E04B 1/38 |
| 9,127,464 | B2 | 9/2015 | Stearns et al. | |
| 9,134,044 | B2 | 9/2015 | Stearns et al. | |
| 9,151,315 | B2 | 10/2015 | McPheeters | |
| 9,181,705 | B2 | 11/2015 | Lanza | |
| 9,350,289 | B1* | 5/2016 | Zvanut | H02S 20/23 |
| 9,422,720 | B2* | 8/2016 | Shevlin | E04D 5/147 |
| 9,422,721 | B2 | 8/2016 | Stearns et al. | |
| 9,422,723 | B2 | 8/2016 | Stearns et al. | |
| 9,447,988 | B2 | 9/2016 | Stearns et al. | |
| D788,951 | S* | 6/2017 | Lopez | D25/199 |
| 9,680,409 | B2* | 6/2017 | Schaefer | H02S 20/23 |
| 9,800,199 | B2* | 10/2017 | Meine | H02S 20/23 |
| 2011/0120047 | A1* | 5/2011 | Stearns | E04D 13/10 52/698 |
| 2012/0144760 | A1* | 6/2012 | Schaefer | E04C 3/06 52/58 |
| 2013/0133270 | A1* | 5/2013 | West | E04B 1/38 52/58 |
| 2013/0167455 | A1* | 7/2013 | Jenkins | E04D 1/36 52/58 |
| 2014/0223838 | A1* | 8/2014 | West | E04B 1/38 52/60 |
| 2014/0353435 | A1* | 12/2014 | Liu | F24J 2/5258 248/74.1 |
| 2015/0069198 | A1* | 3/2015 | West | E04B 1/38 248/237 |
| 2015/0129517 | A1 | 5/2015 | Wildes | |
| 2015/0168021 | A1 | 6/2015 | Wentworth et al. | |
| 2015/0270802 | A1* | 9/2015 | Schaefer | H02S 20/23 248/237 |
| 2015/0330082 | A1* | 11/2015 | Roseveare, Jr. | E04D 1/06 52/58 |
| 2016/0043687 | A1 | 2/2016 | McPheeters et al. | |
| 2016/0043688 | A1 | 2/2016 | McPheeters et al. | |
| 2016/0043689 | A1 | 2/2016 | McPheeters et al. | |
| 2016/0087574 | A1 | 3/2016 | Lanza | |
| 2016/0087576 | A1 | 3/2016 | Johansen et al. | |
| 2016/0102460 | A1 | 4/2016 | West et al. | |
| 2016/0134230 | A1* | 5/2016 | Meine | H02S 20/23 52/698 |
| 2016/0142006 | A1* | 5/2016 | Meine | F24J 2/5245 174/535 |
| 2016/0164452 | A1 | 6/2016 | Wentworth et al. | |
| 2016/0344332 | A1 | 11/2016 | Stearns et al. | |
| 2016/0344333 | A1 | 11/2016 | Stearns et al. | |
| 2017/0058532 | A1* | 3/2017 | Hudson | F24S 25/615 |
| 2017/0288602 | A1* | 10/2017 | Meine | H02S 20/23 |
| 2017/0299102 | A1* | 10/2017 | Ash | F24S 25/00 |
| 2018/0062560 | A1* | 3/2018 | Stephan | F24S 25/61 |
| 2018/0076756 | A1* | 3/2018 | Stephan | H02S 20/25 |
| 2018/0152133 | A1* | 5/2018 | Schaefer | H02S 20/23 |
| 2018/0167020 | A1* | 6/2018 | Truthseeker | H02S 20/23 |
| 2018/0347196 | A1* | 12/2018 | Stearns | F24S 25/636 |

* cited by examiner

NARROW FLASHING FOR WATERPROOF MOUNTING OF SOLAR PANELS TO A ROOF

BACKGROUND OF THE INVENTION

Field of the Invention

This invention pertains to structures for mounting and attaching photovoltaic solar panels on roofs.

Introduction and Related Art

The term "flashing" refers to a thin, generally flat sheet of metal or plastic or composite material that serves as part of an integrated system that waterproofs the mounting structures that hold photovoltaic solar panels on a roof, typically a pitched, composition shingle roof. The flashing serves as a replacement shingle that drains water off of the roof during a rainstorm. The flashing slips underneath the existing shingles at the point where a solar panel is mounted to the roof, typically above an underlying structural beam (rafter). Pipe vent flashings existed before solar attachment flashings, and were the basis for solar flashings. Flashing widths for pipe vent flashings were designed to provide water shedding for roof penetrations due to pipe vents. Pipe vents, and thus roof penetrations due to pipe vents, range in diameter typically from one to four inches. Flashing widths for solar flashings should be designed to provide water shedding for roof penetrations due to lag bolts (solar system attachment purposes). Lag bolts are typically 5/16 inch in diameter. Since the diameters of lag bolts are significantly less than pipe vents, "solar" flashing used to flash lag bolts should be significantly narrower than pipe vent flashings. The length of a flashing is somewhat fixed due to the need for a flashing to extend into the third course of composition shingles. Since a flashing length (height) is fixed, but the proposed width of a solar flashing can be narrower (e.g., less than 7 inches) due to the smaller penetration diameter being flashed, the aspect ratio of a solar flashing can be as high as 2.0, or more. Further, the distance from the flashing aperture to the downslope edge of a typical solar flashing is 3 inches. Exposure of the roof penetration, at the attachment fastener, to rain, snow, snow melt, etc., is then 3 inches from the downslope edge of the flashing. In the present invention, one embodiment is to apply the 3 inch distance to the downslope edge to the edge distance to the sides of the flashing, resulting in a 6 inch wide flashing. Since flashings are typically made of stamped sheet metal, flashings can result in at least two problems: (1) dropping a flashing with a sharp corner onto a roof surface can result in the sharp corner penetrating or lancing an element of the roofing system/water sealing system, and (2) sharp corners can result in cuts to installers' hands, especially in retrofit applications (installation of flashing onto existing roofing systems), since an installer must forcefully insert a flashing under adhered and nailed composition shingles. The use of butyl tape has long been used in the roofing industry (attachment directly to composition shingles, interleaf on corrugated metal roofs, etc.). The application of a butyl pad to provide water sealing between a solar mounting attachment and a metal flashing is a new application and provides a cost advantage over typical solar flashings in that it requires fewer operations and yet results in a product that is equal to if not superior to traditional solar flashings with protrusions at the aperture and some type of EPDM/elastomeric sealing washer.

A large number of flashing patents in a single patent family have been granted to EcoFasten, Inc., including U.S. Pat. Nos. 8,151,522, 8,153,700, 8,209,914, 8,413,388, 8,245,454, 8,166,713, 8,146,299, 8,181,398, 8,701,354, 8,272,174, 8,225,557, 9,127,464, 9,422,721, 9,134,044, 9,422,723, and 9,447,988. U.S. Patent Application Publications 2016/0344332 and 2016/0344333 are also of interest. These types of flashings typically have a cone-shaped, raised protrusion that sticks out above the roofline.

Flashing patents have also been granted to D-Three Enterprises (Zilla) for flashings with raised protrusions, including U.S. Pat. Nos. 8,661,765, 8,869,490, 8,479,455, 8,448,405, 9,068,339, 8,707,654, 8,707,655, 8,752,338, 8,833,032, 8,689,517, and 8,833,033.

Other flashing patents have been granted to Quick Mount PV for flashings with raised protrusions, including U.S. Pat. Nos. 7,762,027, 8,938,932, 7,895,808, and 7,905,064. U.S. Patent Application Publications 2015/0168021 and 2016/0164452 are also of interest.

Still other flashing patents have been granted to Solar City (ZEP) for flashings with raised protrusions, including U.S. Pat. Nos. 8,756,881, 9,097,441, and 9,062,897. U.S. Patent Application Publications 2016/0087576 and 2016/0102460 are also of interest.

Further flashing patents have been granted to C. Lanza for flashings with slanted protrusions, including U.S. Pat. Nos. 8,316,592, 8,869,470, and 9,181,705. Also of interest is U.S. Patent Application Publication 2016/0087574.

Yet other flashing patents have been granted to Snapn-Rack (Mainstream Energy/Sunrun South) for flashings with raised protrusions, including U.S. Pat. Nos. 8,739,471, 8,539,719, 9,151,315, and 8,250,829. U.S. Patent Application Publications 2016/0043687, 2016/0043688, and 2016/0043689 are of interest as well.

At least one flashing patent application has been filed by Ecolibrium. This application for flashings is now published as U.S. Patent Application Publication 2015/0129517.

Several flashing patents have also been granted to Sunmodo for flashings with raised protrusions, including U.S. Pat. Nos. 8,122,648 and 8,935,893.

U.S. Pat. No. 8,713,858 has been granted to Magerack for flashings with raised protrusions.

A patent application by Ironridge for flashings has also been filed; this application is now published as U.S. Patent Application Publication 2016/0134230.

Finally, U.S. Pat. No. 7,921,607 has been granted to Thompson Technology Industries for flashings with raised protrusions.

Against this background, the present invention was developed.

SUMMARY OF THE INVENTION

Improved versions of flat flashings are used for waterproofing mounting hardware that holds photovoltaic solar panels on a roof; typically, such a roof would be a pitched, composition shingle roof. The flashings are narrow in width and have chamfered and/or rounded corners, and a variety of alignment marks printed on the flashing for aligning the flashing with adjacent shingles. The height/width (H/W) aspect ratio of the flashing can range from 1.4 to 2.0, or more.

DETAILED DESCRIPTION OF THE INVENTION

The present invention relates to narrow flashings that are improved versions of flashings and are used for waterproofing mounting hardware that holds photovoltaic solar panels on a roof; typically, such a roof is a pitched, composition shingle roof. These narrow flashings are flat and have no raised protrusions. As such, they are less expensive to manufacture. Water sealing is accomplished through the use of a rubber, butyl, adhesive, or an EDPM washer, which is compressed underneath the head of a lag screw that screws through the roofing layers into an underlying rafter, and which is also used as a sealing pad disposed underneath a bracket (L-foot, slider bar, etc.) that is attached by the lag screw. The y-axis direction aligns with the long dimension of the flashing, and the x-axis aligns with the short dimension of the flashing, as indicated in the figures. The direction of a sloped roof is indicated in the figures as "slope", and is parallel to the y-axis direction. The "downslope end" of the flashing refers to the bottom of the flashing when applied to a sloped roof, and the "upslope end" refers to the top of the flashing.

Figure 1:
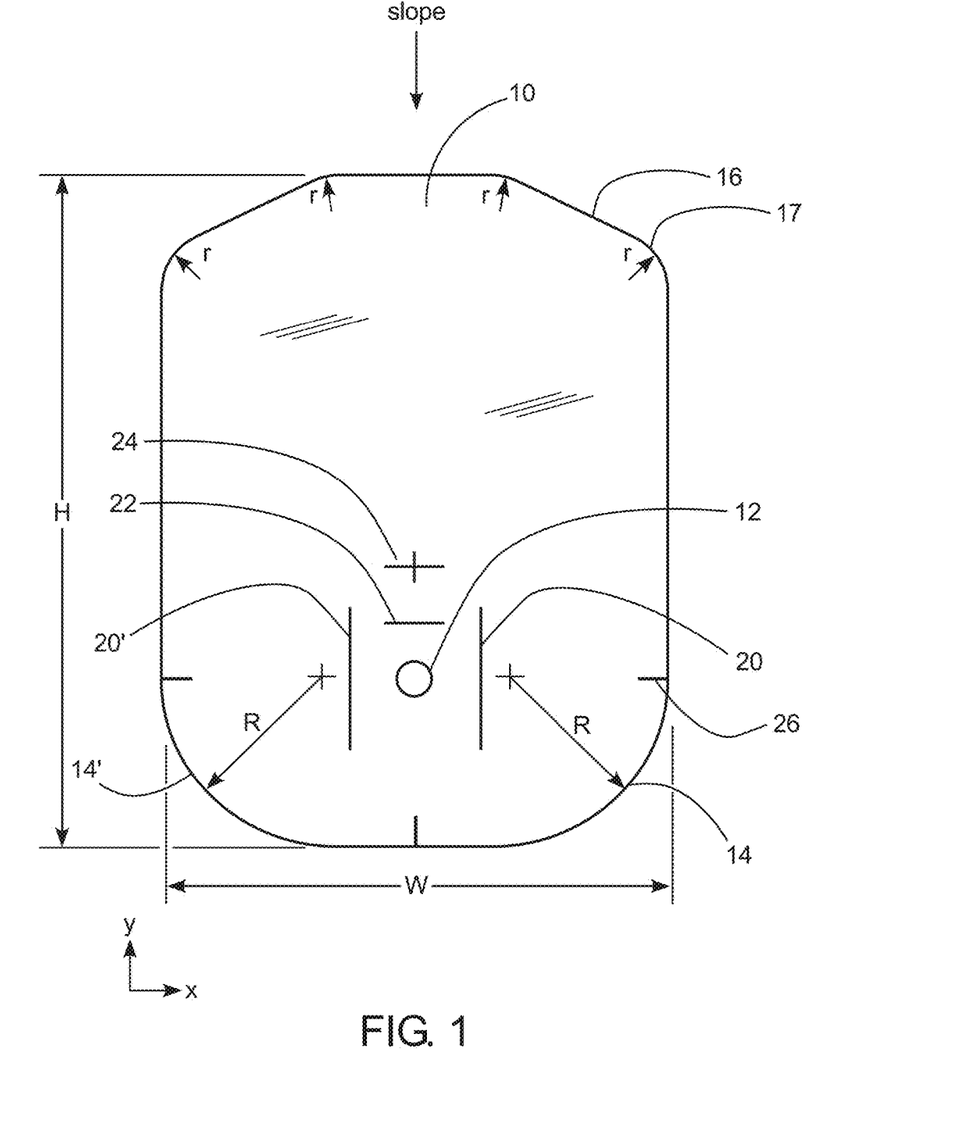
FIG. 1 shows a top plan view of a first example of a flashing, according to the present invention.

FIG. 1 shows a top plan view of a first example of a flashing, according to the present invention. Flashing 10 is a flat sheet of metal (e.g., aluminum or aluminum alloy) or plastic (e.g., polyethylene or polypropylene) or composite (e.g., fiberglass, carbon fiber reinforced, or resin/sawdust mixture), with chamfered and small rounded (with radius=r) corners, including chamfered sections 16 and small rounded corner sections 17, at a first (northern) end of the flashing, and large rounded corners 14, 14' (with radius=R) at a second (southern) end of the flashing. The use of chamfered and/or rounded corners eliminates the problems discussed earlier that are associated with sharp corners. Also, chamfered corners aid in avoiding nails in the above course(s) of shingles. A minimum radius of the small rounded corner sections 17 of the chamfered and small rounded corners can be 0.1 inch. The corner radius, R, can equal W/3, in this first example. A through-hole (aperture) 12 is located midway across flashing 10, in the east-west direction, and approximately ¼ of the way up from the Southern edge. A variety of alignment marks are printed on the surface of flashing 10, including a pair of parallel alignment marks or bars 20 and 20'; a horizontal alignment mark or bar 22 located midway across flashing 10 in the east-west direction and located above the aperture 12; horizontal alignment marks or bars 26 located at opposite sides of the flashing 10; and a "cross" symbol 24 forming an alignment mark located midway across flashing 10 in the x-axis direction and located above the horizontal bar 22. The use of cross symbol 24 aids in aligning the placement of a slider bar (not shown). The four marks that correspond with the center of the aperture 12 are used to aid in alignment with adjacent flashings both north/south and east/west. The other four marks are for alignment of mounting brackets (slider bars or L-feet). Horizontal alignment marks 20, 20', and 22 outline a square shape that matches the shape of a square elastomeric sealing pad (see FIG. 9). Cross symbol 24 is used to align the lower edge of composition tiles (shingles), which flashing 10 slides underneath when installed. The reason that these alignment marks are needed is that when a sealing pad (see FIG. 9) is applied to the bottom of a L-foot bracket (see FIG. 9), the aperture 12 in the flashing cannot be seen. If the marks align with the aperture in the L-foot or slider, the flashing aperture 12 will line up adequately with the aperture in the bracket. The height/width ratio (H/W) of flashing 10 is approximately equal to 1.4 for this first example. In other examples, the height/width ratio (H/W) of flashing 10 can be greater than or equal to 1.4. Flashing 10 is left/right symmetrical across a line drawn through the center of the flashing parallel to the y-axis. The radius, R, of the large rounded corners 14 is at least 5 times greater than the radius, r, of the small rounded corner sections 17. The width, W, can be equal to or less than 7 inches.

Figure 2:
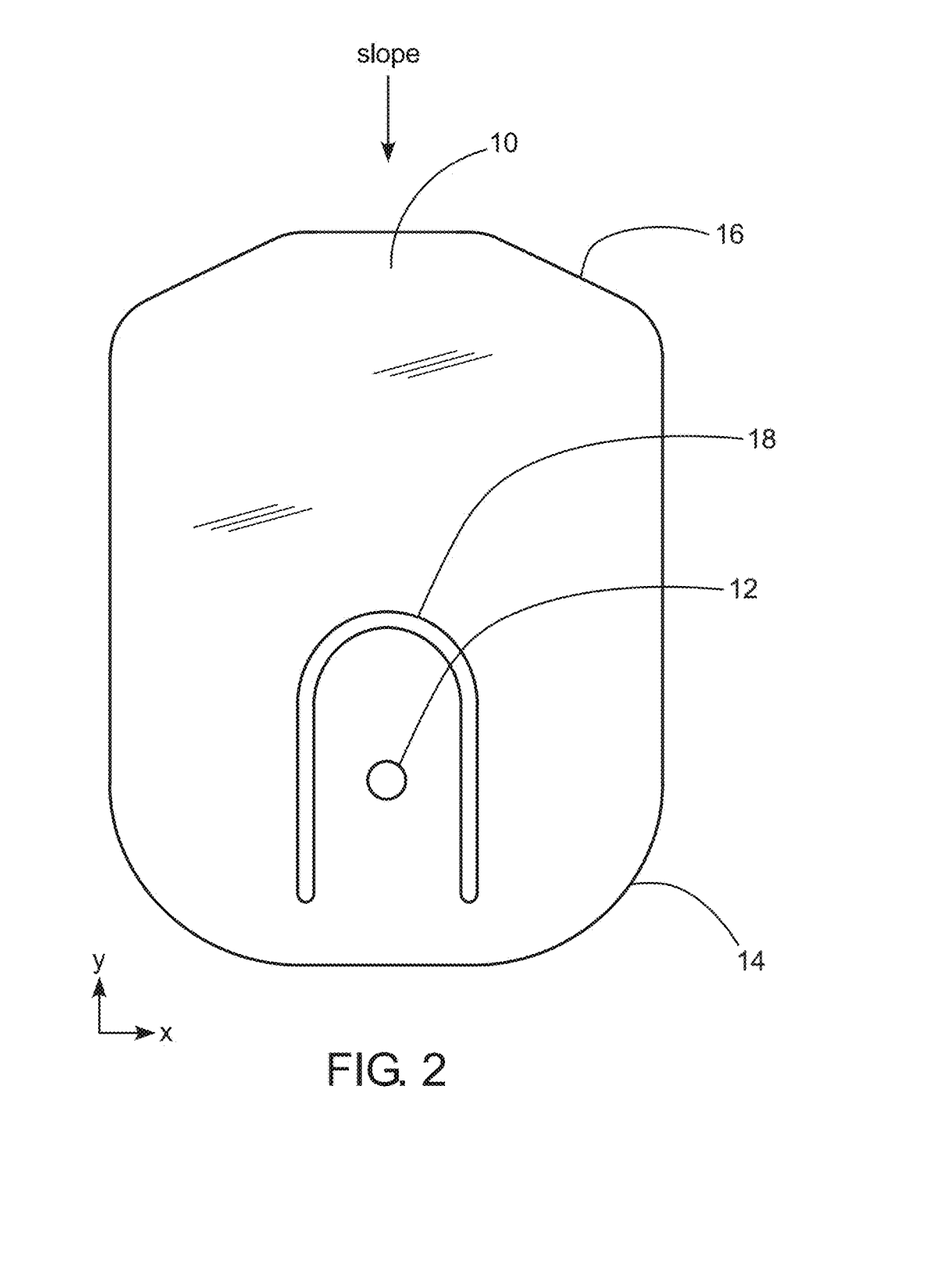
FIG. 2 shows a bottom plan view of the first example of a flashing, according to the present invention.

FIG. 2 shows a bottom plan view of a first example of a narrow flashing, according to the present invention. Flashing 10 has a printed feature 18 comprising an upside-down "U"-shape that encompasses the aperture 12. The purpose of this printed feature 18 is to provide a printed mark that an installer can follow when applying liquid sealant/caulk (e.g., silicone caulk) to the bottom side of flashing 10. The use of an upside-down "U"-shape is to provide a water dam (barrier) to deflect any flow of water from entering aperture 12. One large rounded corner 14 and one chamfered section 16 are also indicated in FIG. 2.

Figure 3:
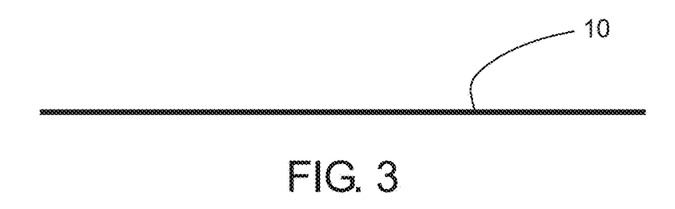
FIG. 3 shows a side view of the first example of a flashing, according to the present invention.

FIG. 3 shows a side view of a first example of a narrow flashing, according to the present invention. The flashing 10 is flat in this view.

Figure 4:
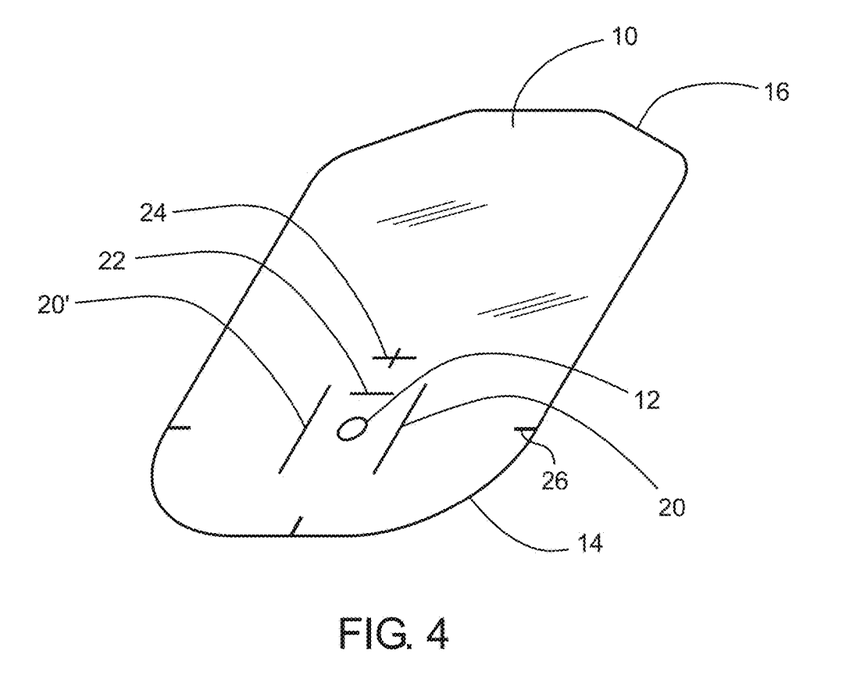
FIG. 4 shows a perspective view of the first example of a flashing, according to the present invention.

FIG. 4 shows a perspective view of a first example of a narrow flashing, according to the present invention. Aperture 12, and alignment marks 20, 20', 22, 24, and 26, printed on flashing 10, can be seen. Chamfered section 16 and rounded corner 14 can be seen as well.

Figure 5:
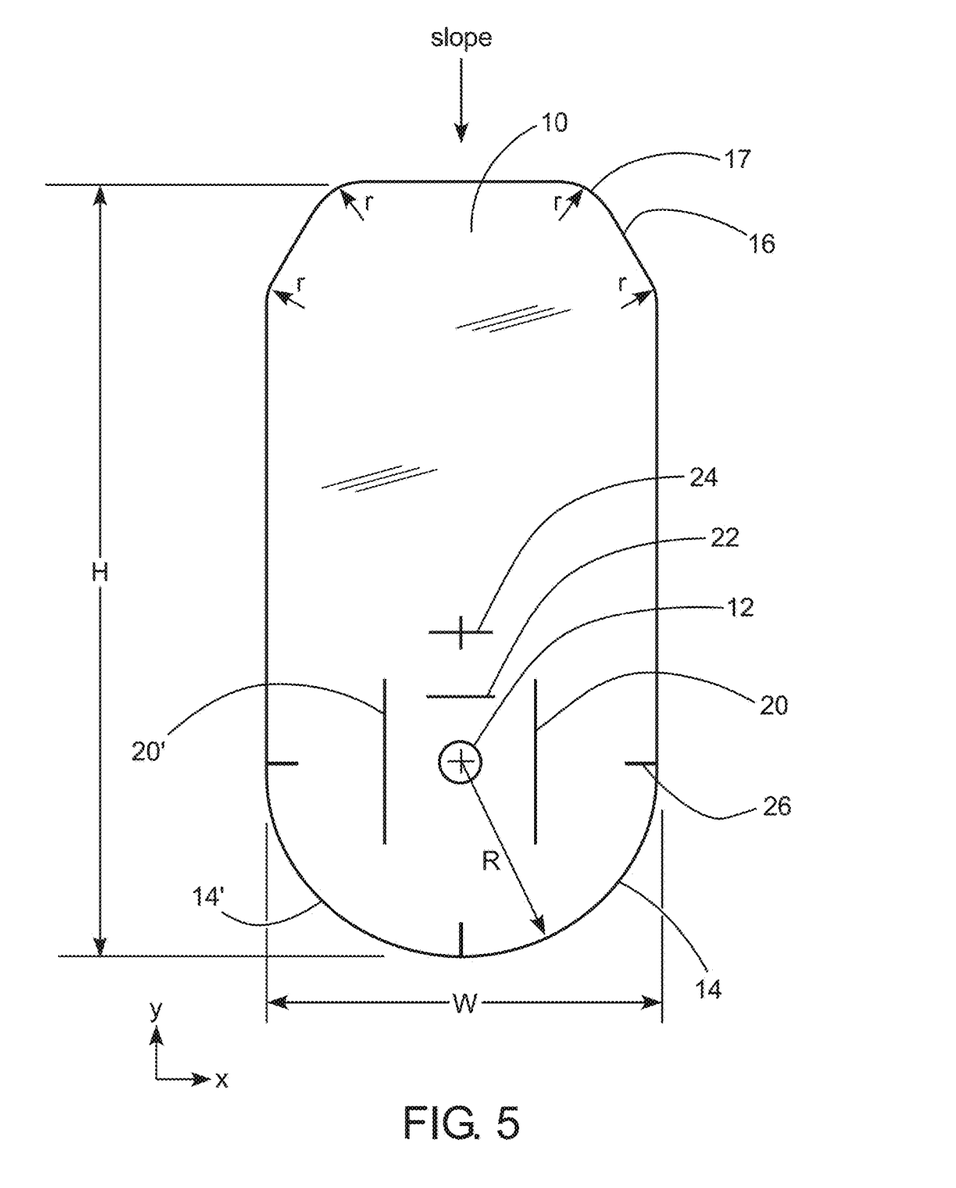
FIG. 5 shows a top plan view of a second example of a narrow flashing, according to the present invention.

FIG. 5 shows a top plan view of a second example of a narrow flashing, according to the present invention. Flashing 10 is a flat sheet or metal (e.g., aluminum or aluminum alloy) or plastic, with chamfered and small rounded corners including small rounded corner sections 17 (each with a radius=r) at opposite ends of respective chamfered sections 16 at a first (upslope) end of the flashing, and large rounded corners 14 (with radius=R) at a second (downslope) end of the flashing. The use of chamfered and/or rounded corners eliminates any problems associated with sharp corners. A through-hole (aperture) 12 is located midway across flashing 10, in the east-west direction, and approximately ¼ of the way up from the downslope edge. The diameter of aperture 12 can be oversized to allow for some misalignment of the lag screw. A variety of alignment marks are printed on the surface of flashing 10, including a pair of parallel bars 20 and 20', a horizontal alignment bar 22 located midway across flashing 10 in the east-west direction and located above the aperture 12, and a "cross" symbol 24 located midway across flashing 10 in the east-west direction and above the horizontal bar 22. The height/width ratio (H/W) of flashing 10 is approximately equal to 2.0 for this second example. In other examples, the height/width ratio (H/W) of flashing 10 can be greater than or equal to 2.0. In this second example, the southern end of flashing 10 is semi-circular shaped, with a radius of the semi-circle being equal to R, which is equal to ½ the width, W, of flashing 10 (i.e., R=W/2). To form the semi-circular shaped end mentioned, the downslope end of flashing 10 contains two rounded corners 14, 14' that meet in the middle to form the semicircular shaped end. The radius, R, of the large rounded corners 14, 14' is at least 5 times greater than the radius, r, of the small rounded corner sections 17.

Figure 6:
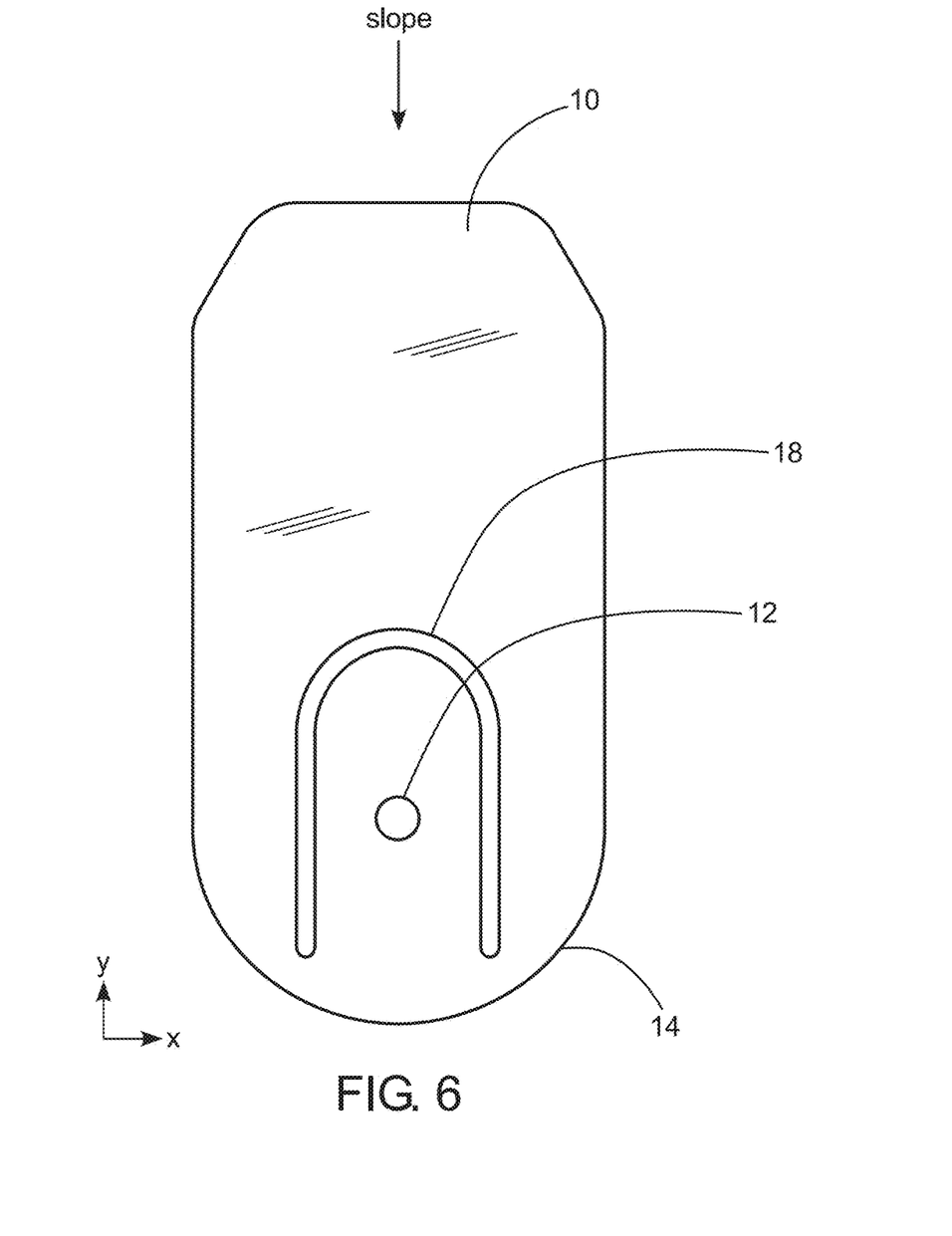
FIG. 6 shows a bottom plan view of the second example of a narrow flashing, according to the present invention.

FIG. 6 shows a bottom plan view of the second example of a narrow flashing, according to the present invention. Flashing 10 has a printed feature 18 comprising an upside-down "U"-shape that encompasses the aperture 12. The purpose of this printed feature 18 is to provide a printed mark that an installer can follow when applying liquid sealant/caulk (e.g., silicone caulk) to the bottom side of flashing 10. The use of an upside-down "U"-shape for the sealant/caulk is to provide a water dam (barrier) to deflect any flow of water from entering aperture 12. One chamfered section 16 is also indicated in FIG. 6.

Figure 7:
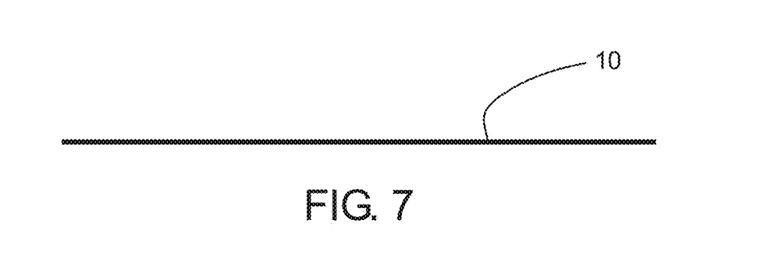
FIG. 7 shows a side view of the second example of a narrow flashing, according to the present invention.

FIG. 7 shows a side view of the second example of a narrow flashing 10 according to the present invention. The flashing 10 is flat in this view.

Figure 8:
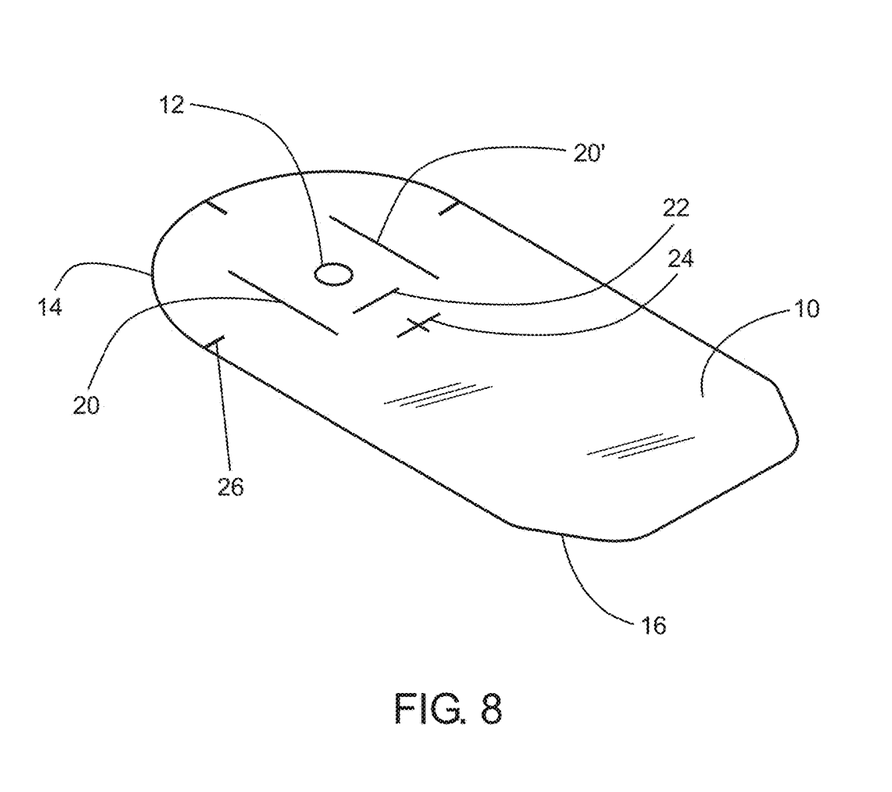
FIG. 8 shows a perspective view of the second example of a narrow flashing, according to the present invention.

FIG. 8 shows a perspective view of the second example of a narrow flashing 10 according to the present invention. Aperture 12, and alignment marks 20, 20', 22, 24, and 26, printed on flashing 10, can be seen. Chamfered section 16 and rounded corner 14 can be seen as well.

Figure 9:
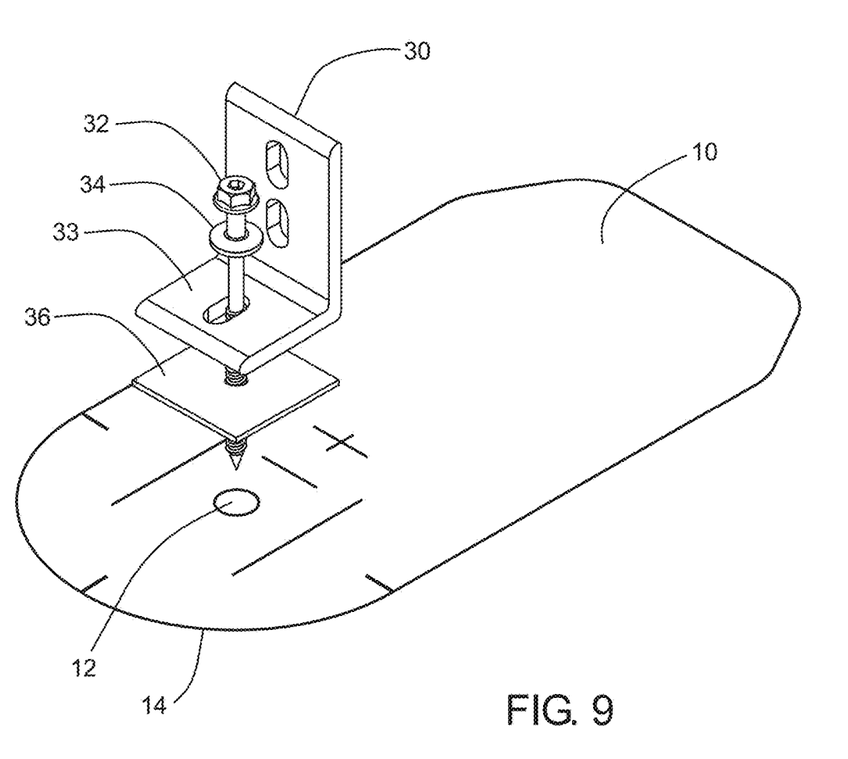
FIG. 9 shows a perspective exploded view of a first example of a narrow flashing assembly, according to the present invention.

FIG. 9 shows a perspective exploded view of a first example of a narrow flashing assembly, according to the present invention. Flashing 10 comprises an aperture 12 through which a lag screw 32 is mounted into an underlying structural support (not shown), which is used to mount an L-foot bracket 30 to the roof (not shown). An elastomeric (e.g., butyl) sealing pad 36 in the shape of a square that matches the bottom of L-foot 30 is disposed in-between the bottom of L-foot 30 and the upper surface of flashing 10, which waterproofs the aperture 12. An elastomeric (e.g. EDPM) washer 34 with a circular steel cap is disposed in-between the head of lag screw 32 and the upper surface of the lower flange 33 of L-foot 30. Flashing 10 comprises a semi-circular, downslope end 14. Alternatively, elastomeric sealing pad 36 can be made of a structural adhesive material, such as a DOW-321 adhesive, or 3M-2110, 2204, or 4110 adhesive tapes (which have been used to attach structural rails to dual-glass PV modules). An adhesion promoter, such as Isopropyl Alcohol (IPA), can be used to promote robustness of the adhesive bond.

Figure 10:
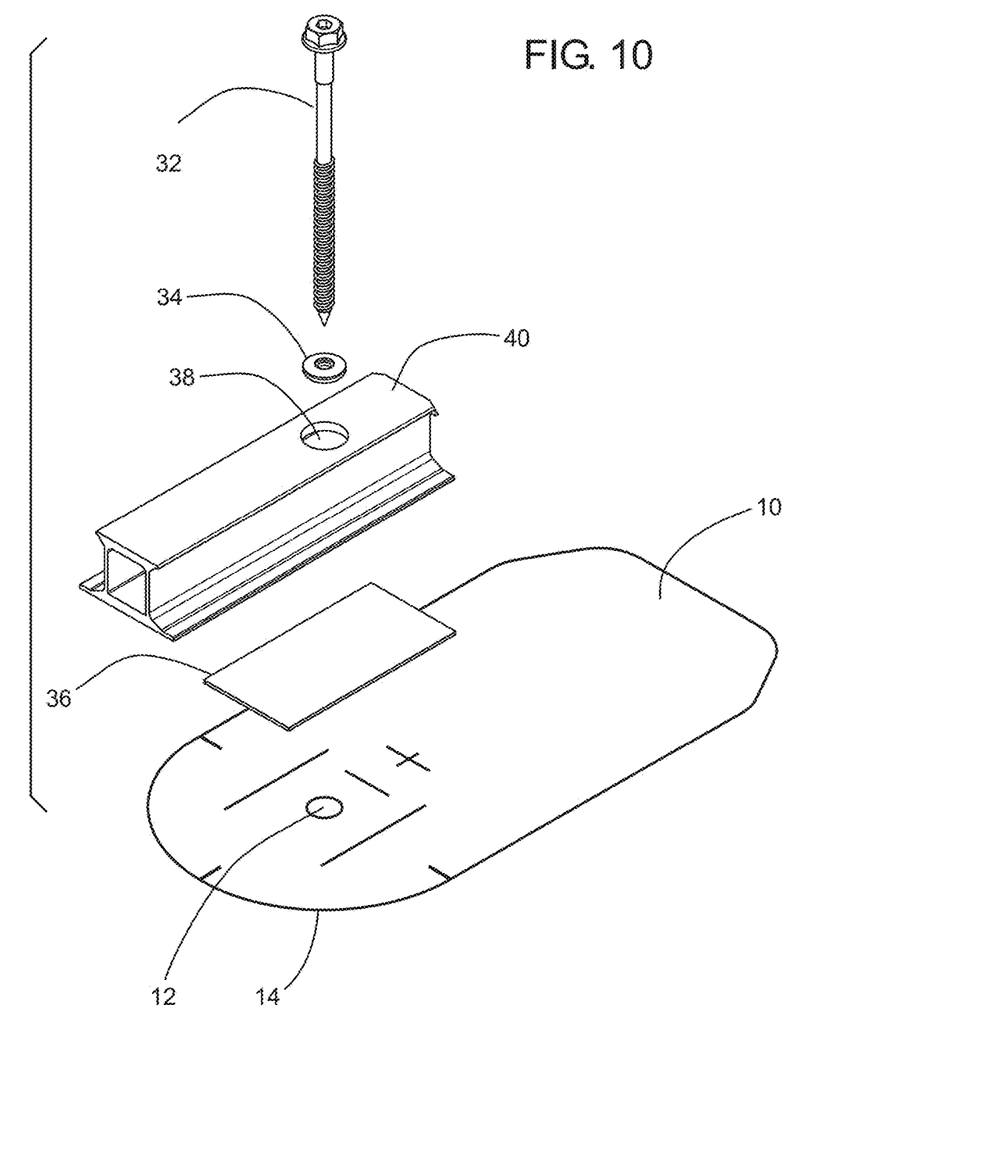
FIG. 10 shows a perspective exploded view of a second example of a narrow flashing assembly, according to the present invention.

FIG. 10 shows a perspective exploded view of a second example of a narrow flashing assembly, according to the present invention. Flashing 10 comprises an aperture 12 through which a lag screw 32 is mounted into an underlying structural support (not shown), which is used to mount a slider bar 40 to the roof (not shown). A rectangular, elastomeric (e.g., butyl) sealing pad 36 is disposed between the bottom of slider bar 40 and the upper surface of flashing 10, which waterproofs the aperture 12. An elastomeric (e.g. EDPM) washer 34 with a circular steel cap is disposed between the head of lag screw 32 and slider bar 40 through a second aperture 38. Flashing 10 comprises a semi-circular, downslope end 14.

Alternatively, elastomeric sealing pad 36 can be made of a structural adhesive material, such as a DOW-321 adhesive, or 3M-2110, 2204, or 4110 adhesive tapes (which have been used to attach structural rails to dual-glass PV modules). An adhesion promoter, such as Isopropyl Alcohol (IPA), can be used to promote robustness of the adhesive bond. A semi-circular downslope end 14 of the flashing is also indicated in FIG. 10.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A flat flashing for use in mounting solar panels to a roof, the flashing comprising:
    a flat sheet of metal or plastic with an aperture disposed in a lower portion of the flashing;
    first and second pairs of rounded upper corners at an upper end of the flashing, with a pair of angled straight-line segments of flashing perimeter disposed in between each adjacent first and second pair of rounded upper corners; and
    a third pair of rounded lower corners disposed in the lower portion of the flashing.

2. The flat flashing of claim 1, further comprising a pair of parallel lines printed on the flashing, disposed equidistant on either side of the aperture and aligned along a north-south direction.

3. The flat flashing of claim 1, further comprising a horizontal bar printed on the flashing, disposed above the aperture and aligned along an east-west direction.

4. The flat flashing of claim 1, further comprising a pair of side marks printed on the flashing, and located on east and west sides of the flashing, at a height equal to a height of the aperture.

5. The flat flashing of claim 1, wherein a ratio of height divided by width of the flashing is equal to 1.4.

6. The flat flashing of claim 1, wherein a ratio of height divided by width of the flashing is greater than or equal to 2.0.

7. The flat flashing of claim 6, wherein the rounded lower corners disposed in the lower portion of the flashing combine to make a semi-circular rounded lower end of the flashing.

8. The flat flashing of claim 1, wherein a ratio of height divided by width of the flashing ranges from 1.4 to 2.0.

9. The flat flashing of claim 1, wherein the aperture is located midway across the flashing in an east-west direction, and approximately ¼ of the way up from a southern-most edge.

10. The flat flashing of claim 1, further comprising a "U"-shaped mark printed on the lower portion of the flashing, and disposed so that the U-shaped mark partially surrounds the aperture.

11. A flat flashing for use in mounting solar panels to a roof, the flashing comprising:
    a flat sheet of metal or plastic with an aperture disposed in a lower portion of the flashing;
    a first pair of rounded upper corners disposed at an upper end of the flashing;
    a second pair of rounded lower corners disposed in the lower portion of the flashing;
    a horizontal bar printed on the flashing, disposed above the aperture and aligned along an east-west direction; and a "cross" printed on the flashing, disposed above the horizontal bar and aligned along an east-west/north-south direction.

12. A flat flashing for use in mounting solar panels to a roof, the flashing comprising:
- a flat sheet of metal or plastic with an aperture disposed in a lower portion of the flashing;
- a first pair of chamfered, rounded upper corners disposed at an upper end of the flashing;
- a second pair of rounded lower corners disposed in the lower portion of the flashing;
- a pair of parallel lines printed on the flashing, disposed equidistant on either side of the aperture and aligned along a north-south direction;
- a horizontal bar printed on the flashing, disposed above the aperture and aligned along an east-west direction;
- a "cross" printed on the flashing, disposed above the horizontal bar and aligned along an east-west/north-south direction; and
- a pair of printed side marks located on east and west sides of the flashing, at a height equal to a height of the aperture;
- wherein a ratio of height divided by width of the flashing is equal to 1.4; and
- wherein the aperture is located midway across the flashing in an east-west direction, and approximately ¼ of the way up from a southernmost edge.

13. A flat flashing for use in mounting solar panels to a roof, the flashing comprising:
- a flat sheet of metal or plastic with an aperture disposed in a lower portion of the flashing;
- a first pair of rounded upper corners disposed at an upper end of the flashing;
- a second pair of rounded lower corners disposed in the lower portion of the flashing;
- a pair of parallel lines printed on the flashing, disposed equidistant on either side of the aperture, and aligned along a north-south direction;
- a horizontal bar printed on the flashing, disposed above the aperture, and aligned along an east-west direction;
- a "cross" printed on the flashing, disposed above the horizontal bar, and aligned along an east-west/north-south direction; and
- a pair of printed side marks located on east and west sides of the flashing, at a height equal to a height of the aperture;
- wherein a ratio of height divided by width of the flashing is equal to 2.0; and
- wherein the aperture is located midway across the flashing in an east-west direction, and approximately ¼ of the way up from a southernmost edge.

14. An assembly for mounting a solar panel to a roof, the assembly comprising:
- a flashing including a flat sheet of metal or plastic with an aperture disposed in a lower portion of the flashing, first and second pairs of rounded upper corners disposed at an upper end of the flashing, with a pair of angled straight-line segments of flashing perimeter disposed in between each adjacent first and second pairs of rounded upper corners, and a third pair of rounded lower corners disposed in the lower portion of the flashing;
- a bracket;
- a lag-screw including a head;
- an elastomeric washer disposed between the head of the lag screw and a lower flange of the bracket; and
- a sealing pad disposed in-between the lower flange of the bracket and the flashing for the purpose of water sealing.

15. The assembly of claim 14, wherein a ratio of height divided by width of the flashing is greater than or equal to 2.0.

16. The assembly of claim 15, wherein the rounded lower corners disposed in the lower portion of the flashing combine to make a semi-circular rounded lower end of the flashing.

17. The assembly of claim 14, wherein a ratio of height divided by width of the flashing ranges from 1.4 to 2.0.

18. The assembly of claim 14, wherein the sealing pad comprises an elastomeric or butyl rubber.

19. The assembly of claim 14, wherein the sealing pad comprises an adhesive material.

20. The assembly of claim 14, wherein a radius of the rounded lower corners is at least 5 times greater than a radius of the rounded upper corners.

21. The assembly of claim 14, wherein a width of the flashing is less than or equal to 7 inches.

22. The assembly of claim 14, wherein the bracket is a slider bar; the elastomeric washer is disposed in-between the head of the lag screw and the slider bar; and the sealing pad is disposed in-between the slider bar and the flashing.

23. The assembly of claim 14, wherein the bracket is an L-foot.

* * * * *